United States Patent [19]
Allard et al.

[11] Patent Number: 5,733,193
[45] Date of Patent: Mar. 31, 1998

[54] BOXING ARCADE GAME

[75] Inventors: Scott Allard, Alamo; Phillip Yee, San Francisco; Matthew F. Kelly, San Ramon; Bryan M. Kelly, Almo; Morton Grosser, Menlo Park, all of Calif.

[73] Assignee: RLT Acquisition, Inc., Pleasanton, Calif.

[21] Appl. No.: 641,140

[22] Filed: Apr. 25, 1996

[51] Int. Cl.⁶ .................................................. A63F 9/22
[52] U.S. Cl. .................................................. 463/8
[58] Field of Search ............... 463/7, 8, 48; 473/417, 473/419, 422, 423, 427, 431, 453, 454, 455, 442

[56] References Cited

U.S. PATENT DOCUMENTS

| | | | |
|---|---|---|---|
| 3,845,956 | 11/1974 | Goldfarb et al. | 273/85 F |
| 3,856,304 | 12/1974 | Matsumoto et al. | 273/85 F |
| 4,027,535 | 6/1977 | Swanson | 73/381 |
| 4,223,474 | 9/1980 | Strauss | 46/87 |
| 4,440,400 | 4/1984 | Neuberger | 273/411 |
| 4,477,083 | 10/1984 | Sowards | 273/411 |
| 4,522,394 | 6/1985 | Broussard | 273/1.5 R |
| 4,593,901 | 6/1986 | Moore | 272/78 |
| 4,720,095 | 1/1988 | Sowards | 282/77 |
| 4,763,275 | 8/1988 | Carlin | 364/508 |
| 4,763,284 | 8/1988 | Carlin | 364/550 |
| 4,834,376 | 5/1989 | Steinberg | 273/26 B |
| 4,850,591 | 7/1989 | Takezawa et al. | 273/85 G |
| 4,883,271 | 11/1989 | French | 273/1 GC |
| 4,903,966 | 2/1990 | Liao | 273/26 R |
| 4,938,478 | 7/1990 | Lay | 273/26 R |
| 4,953,852 | 9/1990 | Donohue | 272/78 |
| 4,995,607 | 2/1991 | Witfield | 473/454 |
| 4,995,610 | 2/1991 | Paoletti | 273/85 F |
| 5,009,424 | 4/1991 | Harth et al. | 273/85 D |
| 5,052,683 | 10/1991 | Wang et al. | 272/76 |
| 5,135,222 | 8/1992 | Spector | 273/58 C |
| 5,135,233 | 8/1992 | Leas et al. | 273/413 |
| 5,147,258 | 9/1992 | Donohue | 482/87 |
| 5,221,243 | 6/1993 | Walker | 482/83 |
| 5,352,170 | 10/1994 | Condo et al. | 482/83 |

*Primary Examiner*—George Manuel
*Attorney, Agent, or Firm*—Hickman Beyer & Weaver

[57] ABSTRACT

An arcade game including a movable object such as a punching bag for a player to repetitively hit or strike during a game. The bag is suspended from a frame structure that is adjustable in height to accommodate differently-sized players. A sensor is positioned to detect when the punching bag swings into a sensed zone and impacts the underside of a support surface. A score is increased each time the punching bag is detected during a predetermined time period. The punching bag is lowered to a playing position during a game and retracted when a game is over so that the punching bag may not be moved between games. An alternate embodiment includes a display screen for displaying visual images such as an opponent that is updated in accordance with the strikes from the player on the punching bag.

43 Claims, 8 Drawing Sheets

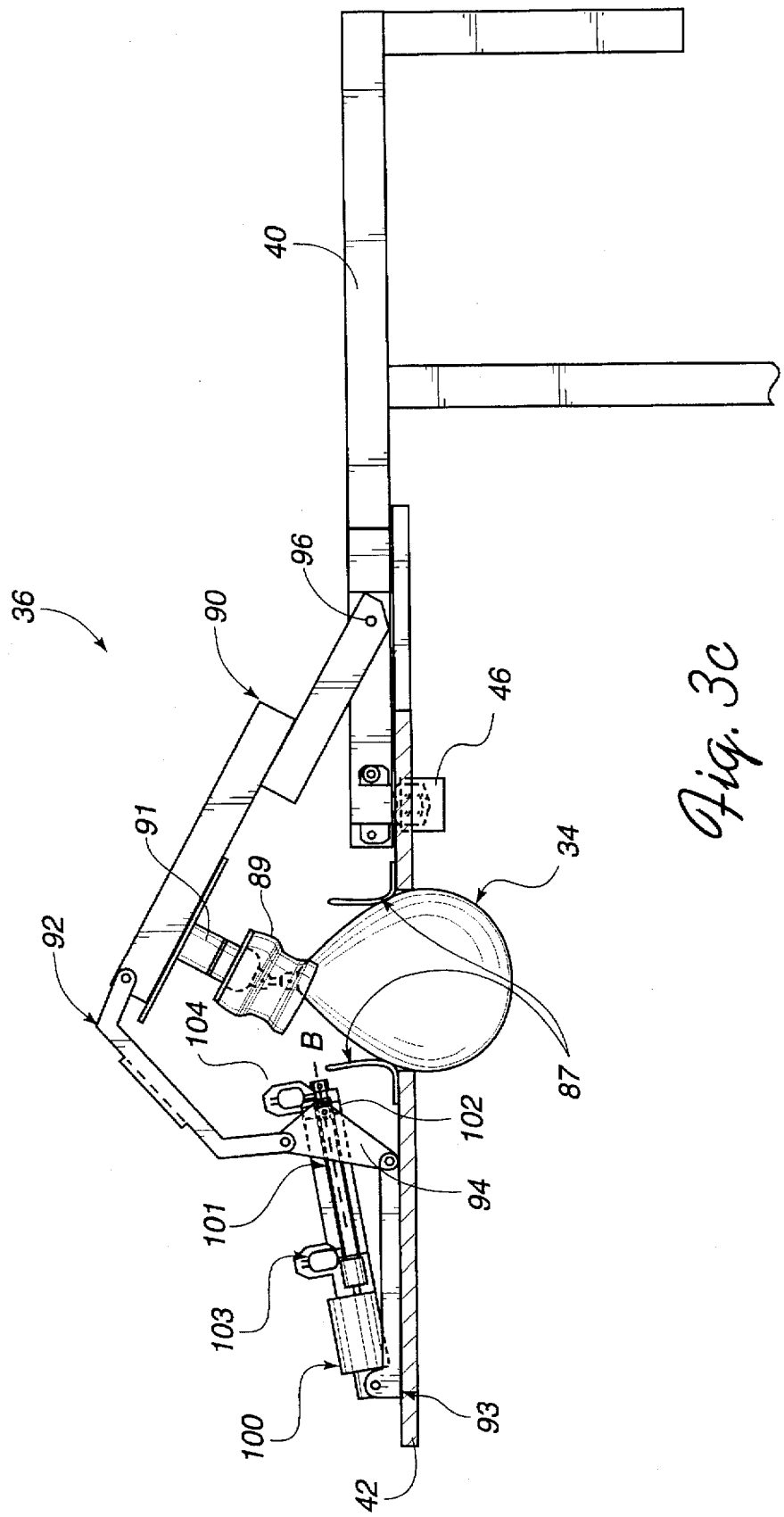

BOXING ARCADE GAME

BACKGROUND OF THE INVENTION

1. Field of the Invention

This invention relates to games normally played in an arcade or similar gaming environment, and more particularly to games allowing a player to strike or hit an object to score points or achieve a goal during the game.

2. Background of the Related Art

Punching bags and other similar striking objects for boxing training and exercise have been in use for some time. A typical punching bag is suspended from a support and allows a player to repetitively strike the punching bag by hitting or punching the bag in one direction, after which the bag strikes a surface and returns to the player to be hit again.

In the prior art, punching bags or striking objects have been developed which are meant for training and exercise purposes. Some striking objects have included sensors for detecting when strikes have landed on the object. For example, in U.S. Pat. No. 4,440,400 of Neuberger, a ball, punching bag, and other objects are disclosed which include microswitches for detecting when the objects are struck by a player. Similarly, in U.S. Pat. No. 4,883,271 of French, a punching bag includes a strip of piezoelectric material for detecting changes in its length when a player punches the bag.

In U.S. Pat. No. 5,221,243 of Walker, a sports training center is disclosed which provides several target objects for the player to strike and which detects hits on the objects using contact switches. A score is provided to the player based on his or her performance.

A problem with the boxing and other striking apparatuses of the prior art is that the sensing devices for detecting strikes on an object are mechanical in nature and therefore subject to quick degradation when frequently used by players. In addition, the devices of the prior art are not very suitable for use as a game in an arcade or similar gaming environment, where supervision of the games may be minimal. Players may make use of the prior art devices without paying for a game or otherwise gain unauthorized access to the device when supervision is low. This tends to discourage players from paying money to play the game and is undesirable in an arcade environment where revenue is necessary to maintain the availability of the game.

SUMMARY OF INVENTION

The present invention provides a boxing game for use in an arcade or other gaming environment. The game reliably detects and scores a player's strikes of an object and adjusts the position of the object to accommodate players' particular needs and to prevent unauthorized use of the game. These improvements provide a more interesting boxing game that is suitable for an arcade environment.

The game apparatus and method of the present invention includes a frame for supporting a player object such as a punching bag. The punching bag is suspended from the frame support so that when the player hits or strikes the punching bag, the bag swings and returns to the player, thereby allowing the player to repetitively strike the punching bag. A scoring apparatus determines a game score based upon a skilled performance of the player in striking the punching bag. A feedback apparatus provides feedback in response to the strikes on the punching bag by the player.

The punching bag is preferably coupled to the support by a flexible hinge so that the bag can swing approximately into a predetermined zone. The bag swings from a rest position of the bag to a position where the bag impacts the support. The game score is preferably based on a number of times that the punching bag has moved into a predetermined sensed zone when struck by the player. A sensor detects when the bag enters the sensed zone and thus indicates when to increase the game score. A preferred sensor is an emitter which emits a beam of electromagnetic energy detected by a detector, such that the punching bag is detected when it blocks the beam. Preferably, the sensor is positioned on the support to detect the object when it impacts the support. The bag is sensed during a game having a predetermined time period, where the time remaining in the game is displayed to the player. A progressive bonus score can also be added to the player's score when the player achieves a progressive goal during a game. A coin slot is included for receiving a coin or other monetary input from a player to begin a game, and an award dispenser can be included to dispense a nonmonetary award to the player at the conclusion of a game.

In an alternate embodiment, the feedback apparatus includes a display screen for displaying visual images of an opponent, for example, in a boxing match or arena. The visual images are updated in accordance with the strikes by the player on the punching bag. The visual images can also include a representation of the player of the game, such as a player's boxing gloves or fists, striking the image of the opponent when the player strikes the punching bag.

In addition, an object retraction mechanism is included for retracting the punching bag into an aperture such that the object cannot swing freely from the support to prevent the player from swinging or moving the bag when a game is not in progress. The bag is extended out of the aperture when a game is in progress. Also, a mechanism is included to allow the player to adjust the punching bag to a desired height where the player can conveniently strike the bag.

The game apparatus and method according to the present invention allows players to repetitively strike a punching bag or other object. The object is reliably detected and a score is increased based on a skilled performance of the player. A preferred emitter-detector sensor detects the bag reliably and does not degrade with use. In addition, the punching bag can be retracted to prevent players from using the punching bag between games to allow the game to effectively be used in an arcade or other environment with minimal supervision. These features add complexity and interest to arcade games and reduce operating and maintenance costs of a boxing arcade game. Player involvement with the game and the revenue produced by the game are thus also increased.

These and other advantages of the present invention will become apparent to those skilled in the art after reading the following descriptions and studying the various figures of the drawings.

BRIEF DESCRIPTION OF THE DRAWINGS

FIG. 3c is a side elevational view of the retraction mechanism in a fully retracted position;

DETAILED DESCRIPTION OF THE PREFERRED EMBODIMENTS

Figure 1:
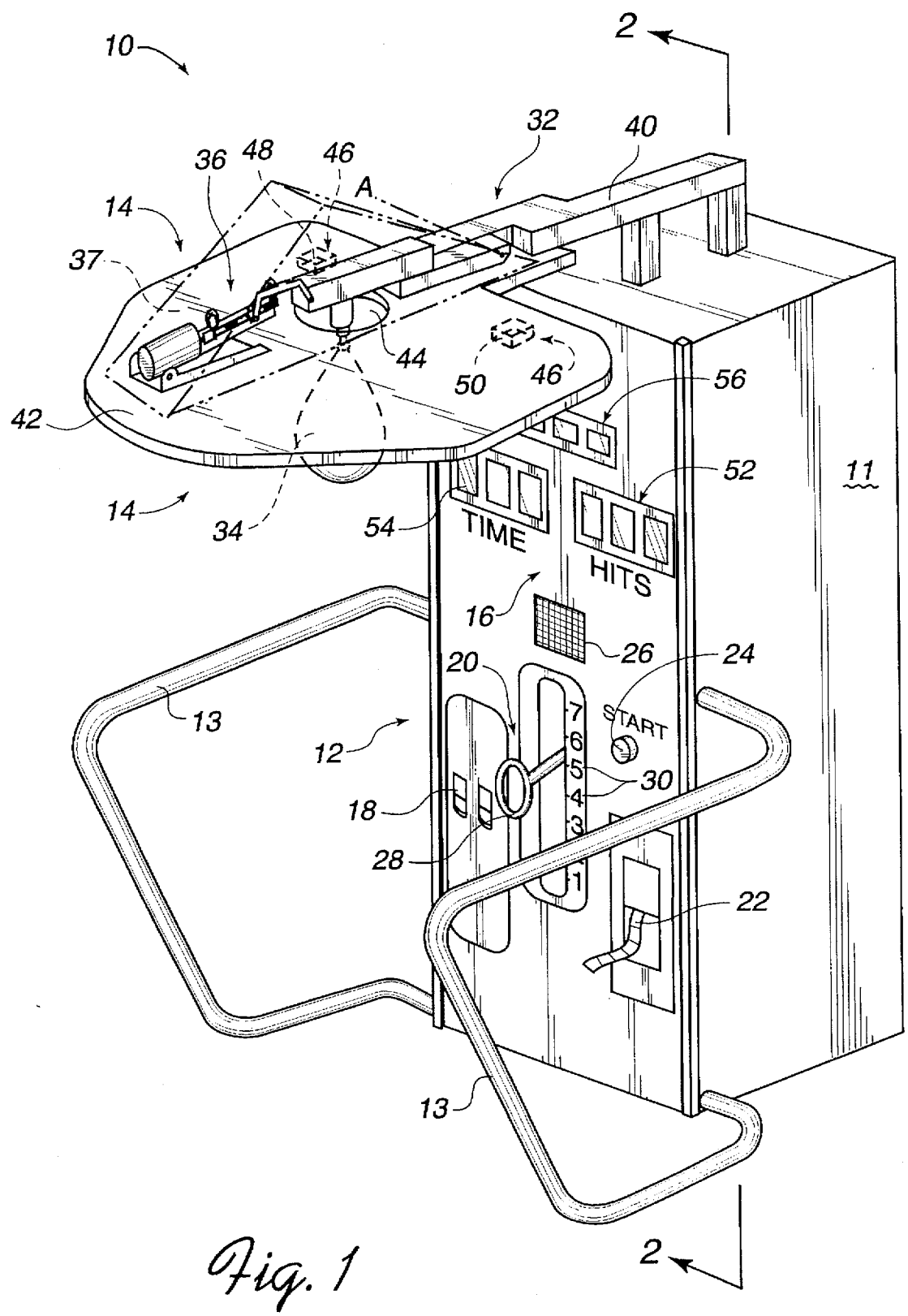
FIG. 1 is a perspective view of the game apparatus of the present invention.

FIG. 1 is a perspective view of a game apparatus in accordance with the present invention. The game apparatus 10 includes a housing 11, a front panel section 12, a playing section 14, and a display section 16. Game apparatus 10 can be used in an arcade or similar gaming environment where players pay money to play the game. Alternatively, game apparatus can be used in more private environments (e.g., at home) for training or amusement purposes.

Housing 11 provides support for game apparatus 10 and encloses various game components as described with reference to FIG. 2. Support bars 13 can be coupled to housing 11 and extend in front of the game apparatus as rails for a player to rest his or her arms before or after a game and to indicate the area where the player should stand when playing the game apparatus 10.

The front panel section 12 includes a coin deposit slot 18, bag position control 20, a ticket dispenser 22, start button 24, and a speaker 26. The front panel section may also include one or more access doors, which can be opened by the operator to access the interior components of the game apparatus as shown in FIG. 2.

Coin deposit slot 18 may accept standard currency coins, game tokens that are often available in an arcade environment, or any other monetary input (e.g., dollar bills, debit card, credit card, etc.). A game begins after a coin or other monetary input has been inserted by the player. The inserted coin is preferably routed to a coin box or other receptacle. A coin return slot is typically also included to return an inserted coin or token to the player in the event the coin becomes trapped in the coin slot mechanism, etc.

Bag position control 20 preferably includes a handle 28 and height indicia 30. Handle 28 can be grasped by the player and moved up or down to one of a number of elevation settings indicated by indicia 30. The movement of handle 28 causes playing section 14 to move up and down as well, as described in greater detail with respect to FIG. 2. Before a game begins, the player can thus adjust handle 20 to move playing section 14 to a convenient height so that the player may easily strike the object 32. In alternate embodiments of the present invention, different position control mechanisms can be employed. For example, a lever, buttons, dials, or other types of controls can be used to adjust the elevation of playing section 14.

Start button 24 is preferably a button, switch, or similar control which starts a game when pressed or activated by a player. Button 24 is functional to start a game after a coin has been deposited in coin slot 18, and can be provided on front panel 12, as shown in FIG. 1, or on a different section of the game apparatus 10, such as the playing section 14. In an alternate embodiment, start button 26 is not provided, and a game starts as soon as a player inserts a coin in coin slot 18.

Ticket dispenser 22 preferably dispenses a ticket award to the player based upon a game score. In this present embodiment, tickets may be accumulated to win various prizes. Other types of awards besides tickets can also be dispensed. For example, baseball or other sports cards, other types of prizes or vouchers, or even coins or currency can be dispensed. Ticket dispensing mechanisms are well-known in the prior art. The awards are stored in a storage area behind the front panel 12 which is described in more detail with reference to FIG. 2.

Speaker(s) 24 emits sounds based on game actions and other game states and is controlled by the game control system. The operation of the speaker will be discussed in greater detail subsequently. Various other types of buttons, switches, and the like can also be included to allow the player of the game to make various selections concerning game play. For example, a player could select a one- or two-player game, a preferred award type, a progressive option, a level of difficulty, etc. using additional controls on front panel 12.

Playing section 14 includes an object support structure 32, a player object 34, and a retraction mechanism 36. Support structure 32 preferably includes a support member 40 and a platform 42. Support member 40 is coupled to and/or extends from the top side of housing 11 of the game apparatus 10 and extends over and in front of the game apparatus. Platform 42 is coupled to support member 40 and is positioned approximately over the position of a player who is playing the game apparatus. Platform 42 includes an aperture 44 through which object 34 retracts and lowers, as described below.

Platform 42 also includes a sensor 46 for detecting player object 32. In the described embodiment, sensor 46 includes an emitter 48 and detector 50 spaced apart on the underside of platform 42. Emitter 48 emits a beam of electromagnetic energy which is detected by detector 50. When the beam is broken, the detector detects the blockage of the beam and sends appropriate signals to the game control system. Other well-known types of sensors can be used in alternate embodiments in different locations, such as motion sensors, impact sensors (contact switches or piezo sensors for detecting force of impact, acoustical sensors listening for sound of impact), potentiometers or encoders (rotation or pivot sensors) in hinge 85, etc.

Player object 34 is an object for the player to strike during a game of the present invention. In the preferred embodiments, object 34 is a punching bag as used when exercising or training for the sport of boxing. The punching bag 34 is typically made of cloth, leather or other soft material and is stuffed with a soft and resilient padding or is otherwise inflated to provide a pliable object to hit. Bag 34 is suspended from support structure 32 by a hinge or other flexible joint and preferably is suspended freely during a game in a rest position. A player preferably stands in front of panel section 12 and bag 34, between support bars 13, and may hit or punch bag 34 with the player's fists or gloves to cause the bag to swing on an arc or path, preferably towards the front panel 12. The player may also hit the bag with his/her upper or lower arms or with another object. The swinging bag contacts the underside of platform 42, after which the bag rebounds (bounces) and swings back in the opposite direction and continues to swing under the influence of gravity and inertia until coming to rest at the rest position if not contacted again by the player. Preferably, a player strikes the bag 34 repetitively (i.e., provides a volley of strikes) to cause the bag to continuously swing, impact platform 42, and fall back towards the player, where the player again strikes the bag. The faster the player strikes the bag, the greater the player's score, as described below. The implementation of a punching bag and the required materials to provide the correct amount of bounce of the bag from the support is well known to those skilled in the art.

When bag 34 has been hit towards front panel 12, the bag impacts platform 42 at an "impact position" and breaks the beam emitted by emitter 48. The detector 50 thus detects each time the bag 32 impacts platform 42, breaks the beam, and falls back towards the player. The bag thus is hit by the player into a sensed spatial "zone", i.e., approximately toward front panel 12 and across the emitted beam, to be sensed by sensor 46. Alternatively, sensor 46 and thus the sensed zone can be placed at a different point along swing paths of bag 34 to detect when the bag 34 is struck by the player. For example, sensors can be placed closer to the rest position of bag 34 so that the movement of bag 34 can be detected even if it does not impact platform 42. In this way, weaker strikes or punches by the player can be detected even if bag 34 does not swing far enough to impact the underside of platform 42.

Other embodiments can also include validation procedures or devices to validate that the object sensed by sensor 46 is bag 34. Since tickets or other awards can be dispensed in some embodiments, players may "cheat" by putting or moving a hand or other objects in the sensing zone of sensor 46 to simulate bag 34 being hit and to receive a large award. Validation procedures/devices can reduce such player abuses. For example, bag 34 can be provided with a special characteristic, such as a special color, texture, material, etc., that is rare and cannot be easily duplicated. Sensor 46 can be set up to detect that special characteristic so that the score will only be increased if that characteristic is detected by sensor 46. Alternatively, a second sensor can be included, for example in hinge 85, to verify that bag 34 is moving in coordination with the object sensed by sensor 46.

In alternate embodiments, other similar types of player objects 34 can be provided, such as stuffed balls, sacks, or figures having recognizable likenesses. Thus, the term "player object" is intended to refer to any such object which can be hit or forced by a player repetitively during game. Player object 34 can also be supported from the floor or a side wall instead of being suspended from a support above a player. In other embodiments, multiple player objects 34 can be provided in playing section 14 in a variety of arrangements, thus allowing two or more players to simultaneously play the game apparatus.

Retraction mechanism 36 is included in playing section 14 to move the player object 34 into and out of a playing position for a game. When a game is not in progress on game apparatus 10, punching bag 34 is preferably in a "retracted position" from which the bag 34 is prevented from moving in any swing paths by a player. In the described embodiment, the bag 34 is moved up into aperture 44 so that only a portion of bag 34 extends from the bottom of the aperture. In this position, the bag 34 is blocked by the edges of the aperture and thus cannot swing freely and will not move when struck by the player. When a player inserts a coin, retraction mechanism 36 is activated by the game control system to lower the bag 34 to its playing position or rest position, where the player may strike the bag during a game. This mechanism prevents players from hitting or otherwise amusing themselves with the player object 34 without paying money to play the game. The operation of retraction mechanism 36 is described in greater detail with respect to FIGS. 3a–3c. Preferably, a cover 37 (shown in dotted lines) covers and protects the retraction mechanism 36.

Display section 16 includes a game score display 52, a time display 54, and an optional progressive display 56. The game score display 52 is preferably an LED display that indicates a game score to the player based on the performance of the player during the game. In the described embodiment, the game score is displayed as the number of "hits", i.e., the number of times the object 34 has been detected by sensor 46, which typically corresponds to the number of times the player has hit or struck the player object 34. The time display 54 is also preferably an LED display that indicates the amount of time that the player has left in a game, e.g. in seconds. Alternatively, the time display can be used to indicate a player's score as the time it took the player to achieve a predetermined number of hits; the lower the amount of time required, the "greater" (i.e. the better) the score of the player.

The displays 52 and/or 56 can also be used to display a high score or ranking achieved by the present and previous players of the game apparatus 10. In other embodiments, score display 52 and time display 54 can be positioned in other areas of game apparatus 10, such as on front panel 12. Other types of types of displays can also be used, such as LCD, video display, etc. An alternate embodiment of game apparatus 10 includes a display screen which can be used to display images during game play and can also be used to display score, time, and other information; this embodiment is described in greater detail with respect to FIG. 4.

Optional progressive score display 56 can also be included in display section 16. Progressive display 56 is similar to game score display 52, except that an individual progressive score, separate from the game score, is displayed. The individual progressive score is accumulated from the current and previous games that have been played on the individual game apparatus 10 and is added to the game score if a progressive goal is achieved during a game. A progressive goal is a specific goal or task which the player performs during a game to receive an award. For example, the player might be required to achieve a score higher than a predetermined amount to achieve the progressive goal. When the progressive goal is achieved, the progressive score displayed by progressive display 56 can be added to the player's game score on display 52, or can be provided as a separate award of tickets or other items dispensed from dispenser 22. The progressive score, for example, can be incremented with every coin inserted in coin slot 18, automatically incremented over time at regular intervals, manually incremented by an operator, etc.

In another embodiment, multiple game apparatuses can all be linked to a separate progressive bonus apparatus which stores a "collective" progressive score for the linked game apparatuses. Each individual game apparatus contributes to the collective progressive score that is displayed by the bonus apparatus. The display 56 of individual game apparatus 10 can alternatively display a collective progressive score instead of or in addition to the individual progressive score described above. The collective progressive score can be awarded to the first player of a linked game apparatus to achieve a progressive goal. Progressive goals, scores, and bonus apparatuses are described in greater detail in U.S. Pat. No. 5,292,127, by Kelly et al., entitled "Arcade Game", and co-pending U.S. patent application Ser. No. 08/374,490, by Kelly et al., entitled, "Redemption-type Arcade Game with Game Token Return," which are both hereby incorporated by reference herein. Additional score displays can also be used to provide scores for multiple players of game apparatus 10 or provide other functions during game play.

The game score displays, player controls, coin detection, award dispensing, and other functions of the game apparatus 10 are preferably controlled by a game control system. This system is described in detail with respect to FIG. 5.

Figure 2:
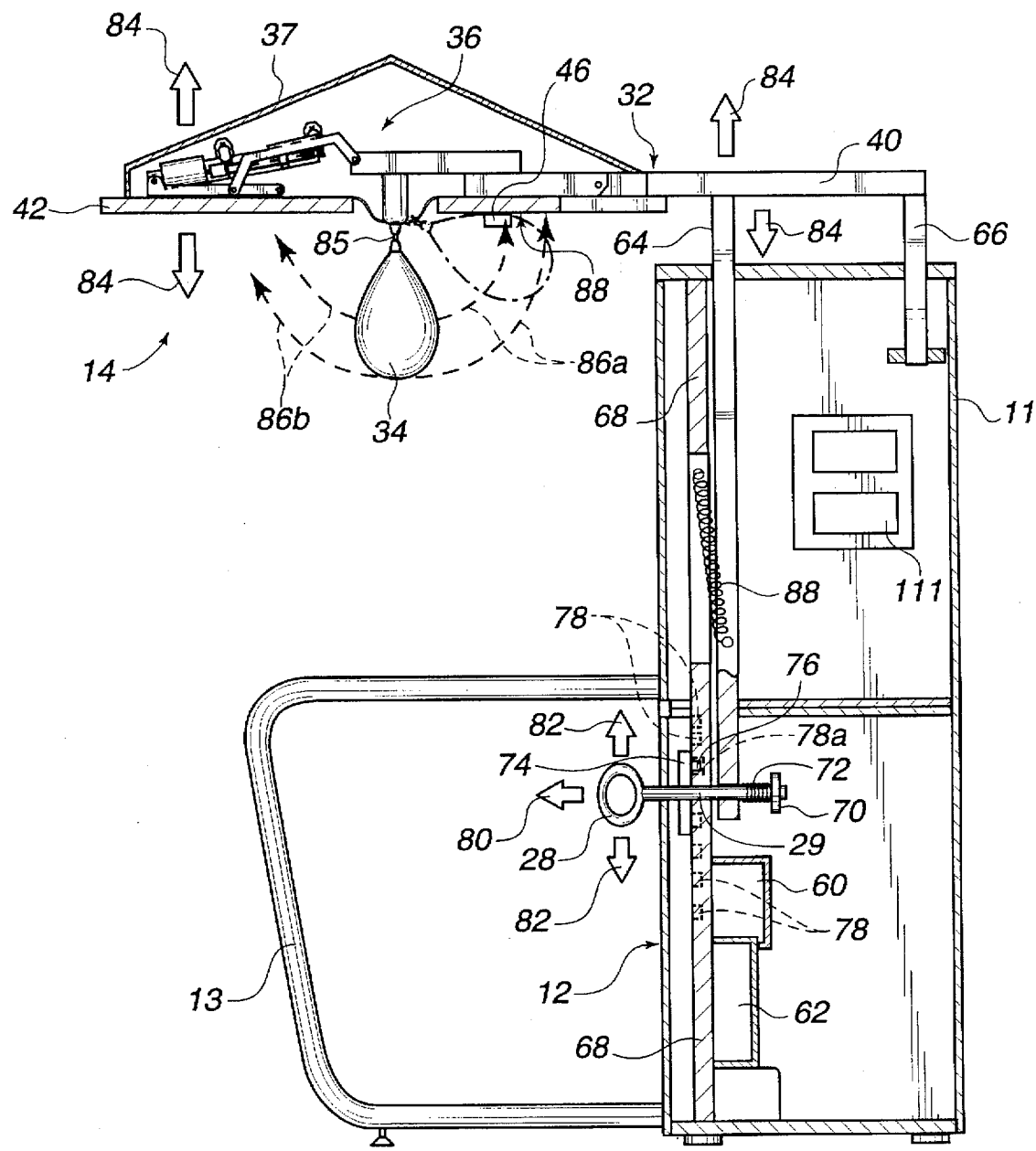
FIG. 2 is a sectional side view along line 2—2 of FIG. 1.

FIG. 2 is a cross-sectional view of the game apparatus 10 taken along line 2—2 of FIG. 1. Game cabinet 11 supports the front panel 12 and playing section 14 and includes a number of interior components.

A player deposits a coin into coin slot 18 in front panel 12. The inserted coin is routed to a cash box 60 provided behind front panel 12 and which stores accumulated coins that players have deposited. The operator of game apparatus 10 can periodically empty cash box 60 when it becomes full. Similarly, a receptacle 62 holds awards such as redemption tickets which can be dispensed to players in some embodiments of game apparatus 10. A game control system 110 can be provided on a side or other support provided in housing 11. The control system is described in greater detail with respect to FIG. 5.

Referring back to the described embodiment of FIG. 2, the player may adjust the elevation of playing section 14 at any time, such as before or after inserting a coin in coin slot 18. Support structure 32 includes a primary vertical member 64 and a secondary vertical member 66, both of which are rigidly coupled to horizontal support member 40. Vertical member 64 extends from support member 40 into housing 11 and down to handle 28. Vertical member 66 extends into housing 11 and provides leverage for the horizontal support beam 40. A vertical support beam 68 is provided within housing 11 and adjacent to vertical member 64 to provide a physically grounded member and support within the game apparatus 10. A rod 29 of handle 28 extends through front panel 12, through an aperture in support beam 68, and through an aperture in vertical member 64. An end plate 70 is rigidly coupled to the end of rod 29, and a spring member 72 is provided on rod 29 between vertical member 64 and plate. 70. A keyed plate 74 is rigidly coupled to rod 29 between front panel 12 and support beam 68. Keyed plate 74 includes a peg 76 which fits into one of a number of elevation holes 78 provided along the length of support beam 68.

The mechanism for adjusting the elevation of playing section 14 operates as follows. The player grasps handle 28 and pulls handle 28 and rod 29 towards the player, as shown by arrow 80. This also pulls peg 76 and keyed plate 74 towards the player and out of the elevation hole 78a in which peg 76 was situated. In addition, spring member 72 compresses as plate 70 moves toward vertical member 64. The player then moves handle 28 up or down to the desired elevation, as indicated by arrows 82. When handle 28 and rod 29 are moved up or down, vertical member 64 and playing section 14 are also moved up or down in the same direction and distance, as shown by arrows 84. Support spring 88 is a heavy spring coupled between the moving vertical member 64 and the grounded beam 68 and assists the player in supporting and moving the playing section 14 and support structure 32. When the player moves handle 28 to the desired elevation indicia 30 on front panel 12, the player releases the handle. Spring member 72 then decompresses and forces the rod 29 and keyed plate 74 away from the player, thus inserting peg 76 into the appropriate elevation hole 78. The playing section 14 is then locked into position at the new height.

In alternate embodiments, other elevation mechanisms can be used to adjust the height of playing section 14. For example, a motor or other actuator can be positioned in housing 11 and a button or other control can be provided on front panel 12 for the player to press. When the player activates the control, the motor can rotate a pulley, chain, or other mechanism to raise or lower playing section 14 to the desired height. Such mechanisms are well known to those skilled in the art.

Player object 34 (e.g., a punching bag) is shown suspended from platform 42. A flexible hinge 85 allows the punching bag 34 to swing approximately in two directions (or more), shown as paths 86a and 86b. Hinge can be a jointed hinge, a ball joint, or other type of hinge. In some embodiments, hinge 85 can prevent the bag 34 from swinging in directions widely varying from paths 86a and 86b so that the bag 34 is detected in the zone sensed by sensor 46. The bag 34 can also be allowed to swing along several paths in the general direction toward front panel 12, so long as the bag can still be sensed by sensor 46, e.g., so long as bag 34 impacts the underside of platform 42 between the emitter 48 and detector 50. In this sense, sensor 46 of the described embodiment detects when the player object moves to the predetermined sensed "zone" in its swing path, e.g., sensor 46 only detects a single spatial dimension of the movement of bag 34. Other sensors in other embodiments might detect the movement of bag 34 in two or more spatial dimensions. Alternatively, the bag might be allowed to swing in any direction or path, where multiple sensed zones are provided or a larger single sensed zone which extends fully or partially around the volume into which bag 34 may swing.

A player preferably hits bag 34 so that the object moves approximately along path 86a in accordance with the force vector of the player's hit, and impacts platform 42 near (or in line with) point 88. The bag then returns in the opposite direction along path 86a and continues to swing along path 86b past the rest position, unless the player hits the object again at some point along path 86a or 86b (a "striking position"). Sensor 46 is positioned to detect the presence of the object 34 each time the bag blocks the beam emitted from emitter 48 from reaching detector 50.

After a coin has been inserted by a player and the start button 16 pressed, a timer begins to count down and is controlled by the control system (shown in FIG. 5), where the count is displayed on time display 54 of front panel 12. The player then proceeds to hit object 34 repetitively. The control system increases the score by one hit for each swing of the bag into point 88 and displays the updated score each time sensor 46 detects that bag 34 has blocked the emitted beam from emitter 48.

After a game is complete, retraction mechanism 36 moves the bag 34 into an aperture in platform 42 to prevent the object from moving when a game is not in progress. The retraction mechanism is described in greater detail with respect to FIG. 3a.

Figure 3A:
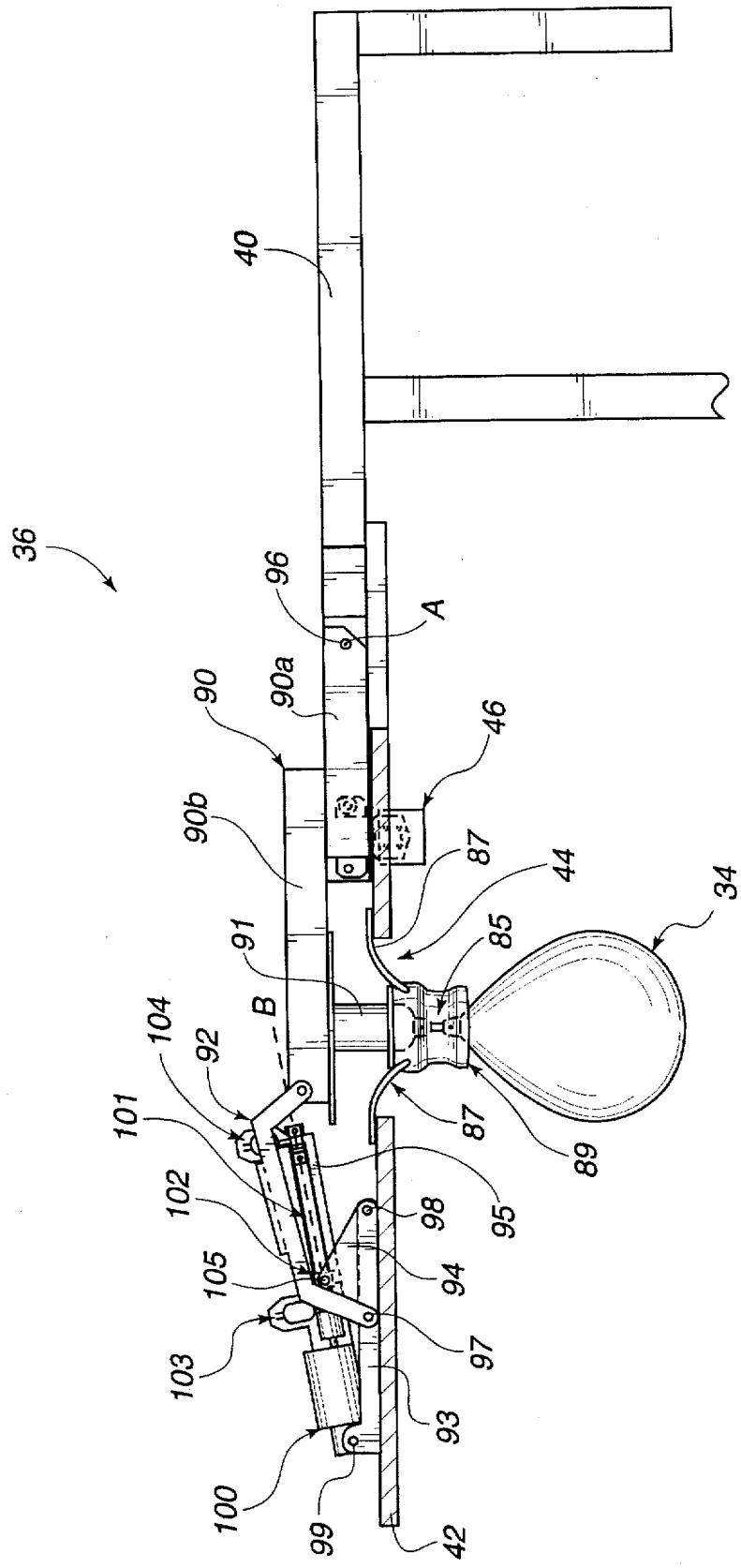
FIG. 3a is an elevational side view of the retraction mechanism of the game apparatus of FIG. 1 in a playing position.

FIG. 3a is a side elevation view of playing section 14 and retraction mechanism 36 of game apparatus 10, where punching bag 34 is in a "playing position" during a game in progress. Retraction mechanism 36 includes a swing arm 90, an extension 91, a link 92, a bracket 93, a crank arm 94, and a pivoting support 95. Swing arm 90 includes a hinged portion 90a rigidly coupled to a raised portion 90b. Hinged portion 90a is rotatably coupled to horizontal support beam 40 at hinge 96 and can rotate about axis A. Raised portion 90b is coupled to hinged portion 90a at one end and is rigidly coupled to extension 91 at its other end. Extension 91 extends down through aperture 44 in platform 42 and is coupled to player object 34, such as a punching bag, by hinge 85. Preferably, irises 87 are coupled to the edges of platform 42 at aperture 44 to prevent players from placing hands or other objects through aperture 44. The irises are preferably made from rubber or other flexible material so that bag 34 may be retracted (described below). A flexible cover 89 made out of a flexible material such as leather, preferably protects hinge 85 from interference from players and provides an ornamental appearance for the punching bag 34.

Raised portion 90b of swing arm 90 is also rotatably coupled to link 92. Link 92 is rotatably coupled to crank arm 94 at a hinge 97. Crank arm 94 is rotatably coupled to bracket 93 at a hinge 98. Bracket 93 is rigidly coupled to platform 42 to provide a grounded base for pivoting support 95, and the pivoting support is rotatably coupled at one end to bracket 93 by a hinge 99. Pivoting support 95 includes a number of components, including a motor 100, a lead screw 101, a power nut 102, an extend limit switch 103, and retract limit switch 104. Motor 100, which can be an actuator such as a DC motor, is rigidly coupled to pivoting support 95 and can be controlled by the control system 110 of game apparatus 10 (described with reference to FIG. 5). A rotating shaft of motor 100 is rigidly coupled to an end of threaded lead screw 101 and rotates the lead screw about axis B when the motor is powered. Power nut 102 is rotatably coupled to and interlocked with the threads of lead screw 101 such that the nut 102 moves along the lead screw when the screw is rotated. Power nut 102 is also rotatably coupled to crank arm 94 at hinge 105 such that when nut 102 moves along lead screw 101, crank arm 94 is lifted and rotates about hinges 98 and 105, as demonstrated below.

Pivoting support 95 also includes extend limit switch 103 and retract limit switch 104. Extend limit switch is positioned at the motor end of lead screw 101 and is operative to deactivate motor 100 (i.e., disconnect the motor from power) when power nut 102 contacts the switch. Since power nut 102 contacts the switch 103 when punching bag 34 is fully extended to the playing position, switch 103 determines the point at which to stop lowering bag 34 through aperture 44. Retract limit switch 104 is similar to switch 103, but is positioned at the end of lead screw 101 opposite to motor 100. When power nut 102 moves to the end of lead screw 101 and contacts switch 104, punching bag 34 is fully retracted, and the switch deactivates motor 100. Switches 103 and 104 can either turn off the power to motor 100 locally and be switchable by control system 110; or, the switches 103 and 104 can send signals to control system 110 which then proceeds to deactivate the motor 100 with appropriate commands.

Figure 3B:
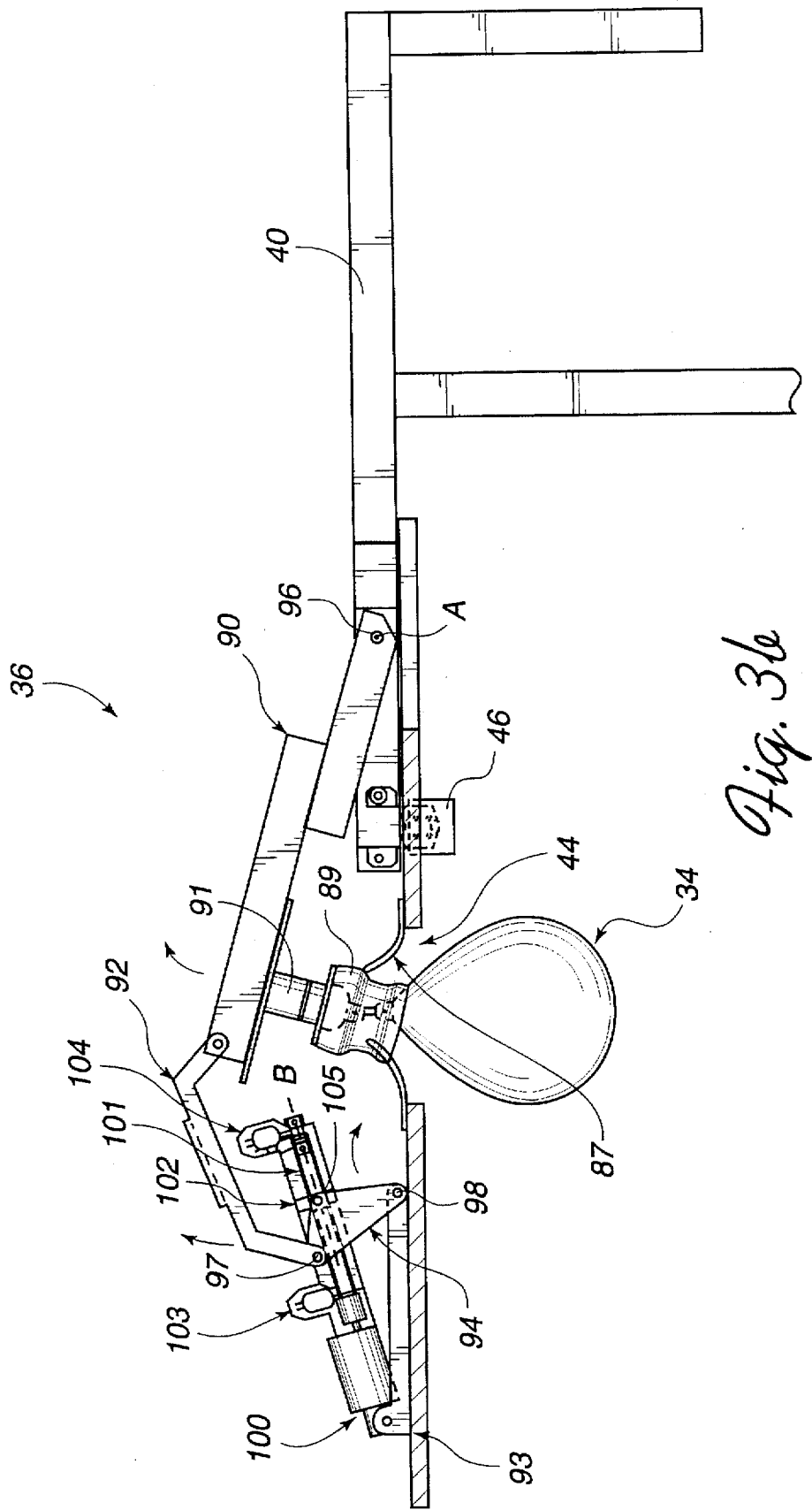
FIG. 3b is a side elevational view of the retraction mechanism in an intermediate position.

FIG. 3b is a side elevation view of retraction mechanism 36 at an intermediate stage between the playing position and the retracted position. Motor 100 is activated by control system 110 to rotate lead screw 101 such that power nut 102 moves away from the motor along the lead screw. As power nut 102 moves along screw 101, crank arm 94 pivots about hinge 105 connected to the nut and also pivots about hinge 98 to move in an upward direction. This in turn moves the hinge 97 end of the crank arm in an upward direction, and thus moves link 92 upward. Link 92 is rotatably coupled to swing arm 90 such that when link 92 moves upward, the swing arm is pivoted about hinge 96 connected to the horizontal support 40. Swing arm 90 is rotated in an upward direction, which retracts extension 91, hinge 85, and punching bag 34 through aperture 44. Flexible irises 87 flex as the bag 34 moves in the upward direction.

FIG. 3c is a side elevation view of retraction mechanism 36 at a fully retracted position. Power nut 102 is positioned at the end of lead screw 101 opposite motor 100 and has contacted switch 104 to deactivate motor 100. Crank arm 94, link 92, and swing arm 90 are at their furthest pivot points from their positions as shown in FIG. 3a. Punching bag 34 is fully retracted in aperture 44 such that the bag 34 preferably engages the sides of aperture 44. This position is effective in preventing bag 34 from moving when players try to force the bag in the retracted position, thus preventing players from unauthorized use of the punching bag when no money has been inserted in coin slot 18. Flexible irises 87 are fully flexed to accommodate the retracted position of bag 34.

The reverse process to the process shown by FIGS. 3a–3c is used to lower the punching bag 34 from the retracted position of FIG. 3c to the extended or playing position of FIG. 3a. In other embodiments of game apparatus 10, other types of retraction mechanisms can be used in place of mechanism 36.

Figure 4:
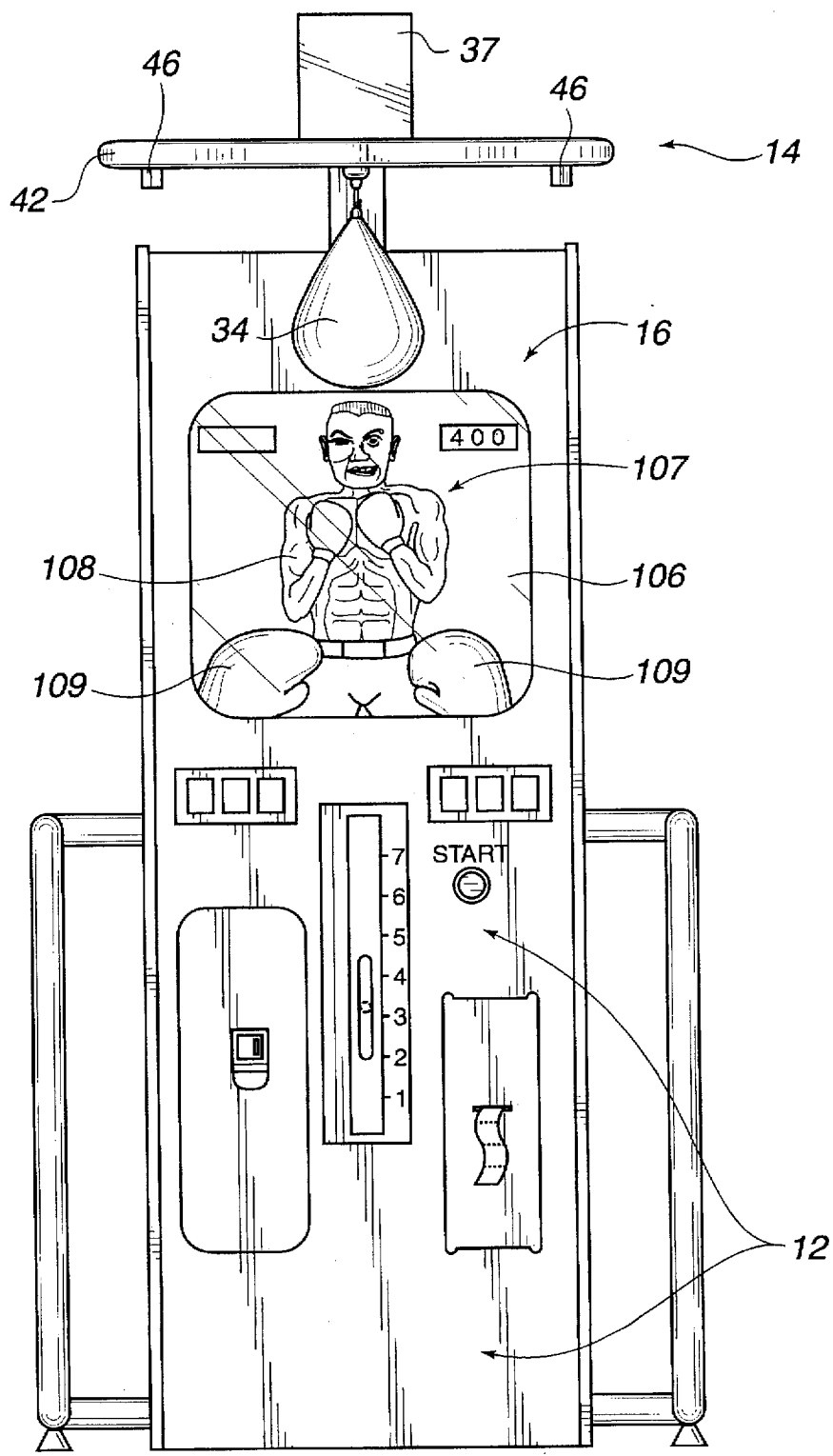
FIG. 4 is a front view of an alternate embodiment of the game apparatus of the present invention.

FIG. 4 is a front view of an alternate embodiment 10' of game apparatus 10. Game apparatus 10' includes a front panel section 12 and playing section 14 similar to apparatus 10 as described with reference to FIGS. 1–3b. In embodiment 10', display section 16 additional includes a display screen 106. Display screen 106 can include a conventional cathode ray tube (CRT) or other standard video display, or another type of display, such as an liquid crystal diode (LCD), electroluminescent, or plasma display.

Display screen 106 displays images 107 which are updated by the control system 110 in response to player actions during a game. In the described embodiment, images 107 can include an image 108 of an opponent in a boxing match or arena. The image 108 can be animated so that the opponent swings punches toward the viewing player, moves from left to right, speaks words and taunts (which can be output by speaker 24), and otherwise acts as a boxing opponent. Images 107 can also include images 109 of boxing gloves or fists which represent the hands of the player of game apparatus 10'. When the player hits bag 34, sensor 46 detects the bag and sends a signal to the control system 110. The control system then updates the images 107 appropriately. For example, the glove image 109 can be moved to the face of the opponent image 108 when the bag 34 is hit by the player. The opponent image can then be animated to fall backward or recoil as if hit by a boxing glove. The control system can also check for various conditions which change the display of images 107. For example, if the player hits bag 34 a predetermined number of times within a predetermined time period, the opponent image 108 can be knocked down and the word "knockout" or similar messages displayed and/or output from speakers 24. Such a "knockout" can also be provided as a progressive goal for the player to achieve. The opponent image might also "block" the glove images 109 with its own gloves unless a predetermined rate of hits is provided by the player, in which case the opponent 108 cannot block the blows and gets hit in the face by glove images 109. The opponent image can also be made to duck, dodge, or weave about so that a player must time his or her punches on bag 34. Also, a predetermined number of rounds or an entire boxing match can be simulated, with a score provided for the player indicating the player's progress in the match. Different types or names of opponents can be displayed on display screen 106 if previous opponents are defeated by the player.

In other embodiments, additional features can be added to game apparatus 10 or 10' to more realistically simulate boxing the opponent displayed on display screen 20. For example, additional sensors 46 can be placed on platform 42 or in hinge 85 to more accurately detect the spatial position of bag or other object 34. Or, a tracking device can be placed inside bag 34 so that the position of the bag can be accurately detected by sensors external to the object. For example, a metallic or device of other material can be placed in bag 34, and sensors can be placed in a pattern such as a grid on platform 42 to detect the x and y coordinates of the bag. Alternatively, emitter devices external to bag 34 might emit beams that are reflected by bag 34 and sensed by detectors that can calculate the position of the bag 34 from the location and angle of the detected beams. Such devices for detecting objects are well known to those skilled in the art for use with simulation devices for golf, baseball, and other games.

Once the control system knows a more accurate position of the bag 34, the images 107 can be updated more realistically. For example, if a player punches bag 34 with his or her left hand, the bag 34 may move forward in a direction slightly to the right. If the sensors can distinguish this type of movement, the control system can move the glove image 109 corresponding to the moved hand of the .player to hit the opponent image 108. Alternatively, the location of a player's arms and hands can be sensed to more accurately determine when the player strikes the bag 34 and to accurately portray the position of the player's hands on display 106.

In addition, the force exerted on player object 34 by the player can be sensed. For example, force sensors can be placed on bag 34, such as at hinge 85, to determine the amount of force that the player used in hitting the bag. Such force sensors are well known to those skilled in the art. Or, an impact sensor can be positioned on the underside of platform 92 to receive and detect impacts with bag 34 and detect the force therefrom, as is well known to those skilled in the art. Alternatively, the velocity of the bag 34 along path 86a or other paths can be measured using a sensor for detecting the bag 34 when the object is positioned at the rest position and a second sensor such as sensor 46 for detecting the object at the impact position or other sensed position. The time period that is measured for the bag to travel between rest and impact positions is used, as well as the known distance between these two positions, to calculate a velocity of bag 34. The force exerted by the player can be derived as proportional to the measured velocity of the bag. Other capactive or restitive sensors can be placed in hinge 85 to detect pivotal or rotational movement of bag 34 and/or to detect when bag 34 is moved in the velocity or force determination.

The control system can then update images 107 in accordance with the force of the hits on bag 34 from the player or the velocity of the bag 34. For example, when the player lightly hits bag 34, the opponent image can be animated with a blocking gesture or a with a light impact from a glove 109. If the player hits bag 34 with great force, the image 108 can be animated to be knocked over or to receive a severe blow to the head or body from glove 109. In yet other embodiments, force actuators, such as motors, can be provided on bag 34 as is well known to those skilled in the art. The actuators can output forces on bag 34 as controlled by control system 110. This would allow the player to receive tactile feedback to simulate the opponent 108 hitting the player back.

In other embodiments, multiple game apparatuses 10 or 10' can be linked to provide a game for multiple players. The control systems of two or more game apparatuses can be connected through the use of cables, wires, network cards, modems, wireless transmitter/receivers, or other well-known networking devices. The linked game apparatuses can be networked locally and provided at the same location, such as a gaming arcade, restaurant, etc., or the linked gaming apparatuses can be situated at different locations or areas and connected through a large scale network, such as the global Internet. The data sensed from one game apparatus can be provided to the other linked game apparatus(es) so that images on both games can be updated accordingly. For example, if two game apparatuses 10' are so linked, a first player can punch a first object 34 on the first game apparatus and the first display screen 106 will show a glove 109 moving to hit the opponent image. The second game apparatus also receives the data that the first object has been punched, and accordingly updates the opponent display on the second display screen 106 to show the opponent image moving his arm in a punching motion. The second player thus views the opponent as though the second player is being punched. Likewise, the first player views the opponent image moving in accordance with input received from the second player on the second game apparatus. In this fashion, two or more players can have a boxing match, and the player who gets "knocks out" the other player or scores the highest amount of points or hits wins the game.

Figure 5:
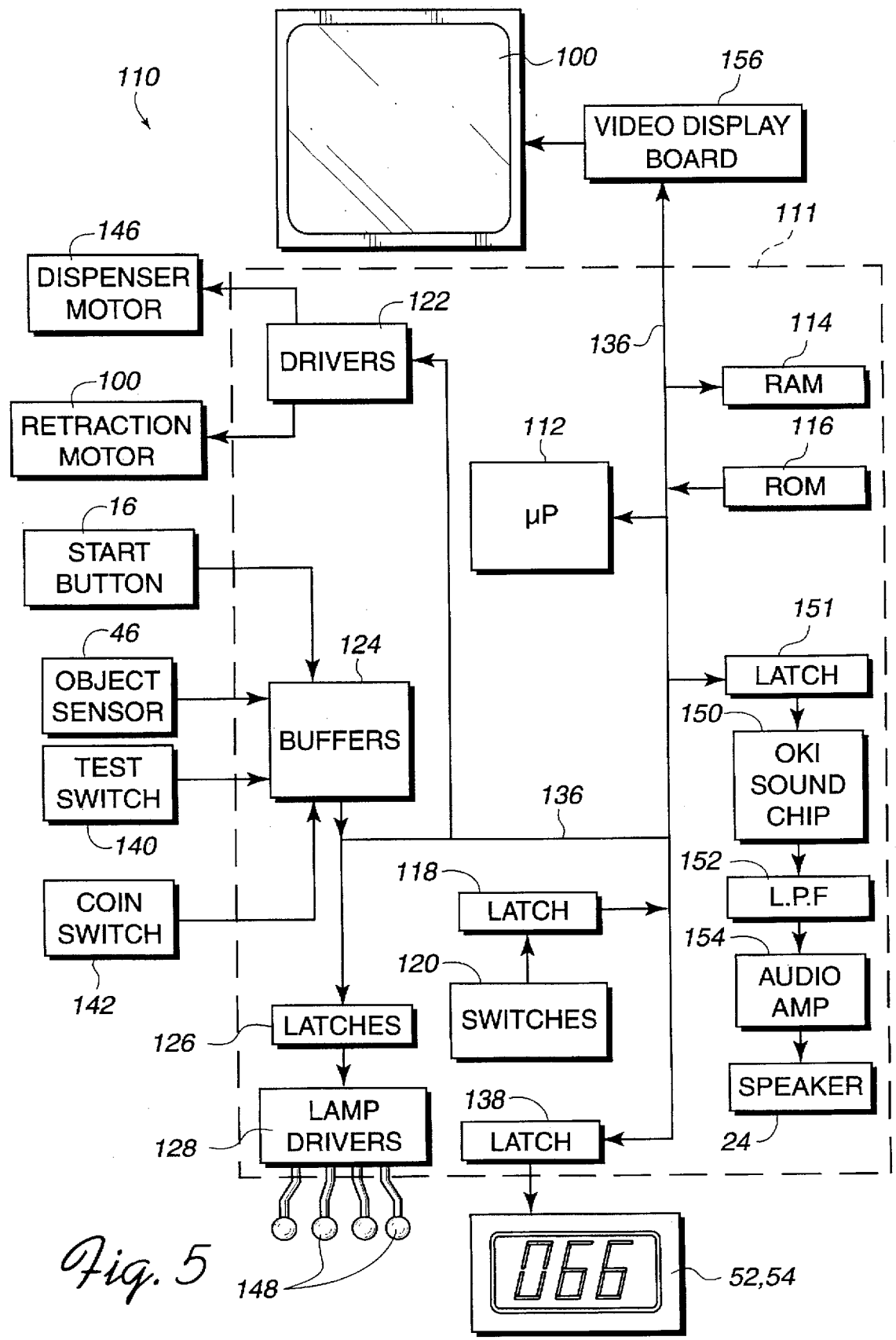
FIG. 5 is a block diagram illustrating a game control system for the game apparatus of the present invention.

FIG. 5 is a block diagram of a control system 110 of game apparatus 10. The control system, for example, can be implemented on one or more printed circuit boards 111 which can be located in the interior of game apparatus 10, for example, on a side in the interior of the game apparatus. The components of control system 110 include a microprocessor 112, random access memory (RAM) 114, read-only memory (ROM) 116, a latch 118, DIP switches 120, a game score display 52 and 54, drivers 122, buffers 124, latches 126, lamp drivers 128, sound chip 130, low pass filter 132, audio amplifier 134, and speaker 24.

Microprocessor 112 controls the operations of game apparatus 10. A suitable microprocessor is an 8-bit microprocessor, such as the Intel 8031, which has the range of features adequate for the task, including eight data lines and sixteen address lines. Other, more powerful microprocessors can also be used, especially for the display screen embodiment of FIG. 4. The microprocessor preferably executes software instructions that can be stored in memory, as explained below. Microprocessor 112 is coupled to ROM 116 by a data/address/control bus 136. The ROM 116 is preferably an erasable, programmable read-only memory (EPROM) that contains the start-up instructions and operating system for the microprocessor 112. Microprocessor 112 is connected to RAM 114 by bus 136 to permit the use of RAM for scratch-pad memory. Methods for coupling ROM 116 and RAM 114 to the microprocessor 112 by bus 136 including enable, address, and control lines are well-known to those skilled in the art.

The microprocessor 112 is also coupled to a latch 118 by the bus 136. The switches 120 coupled to latch 118 provide selectable game functions that the operator of the game unit may change to his or her liking. These selectable functions can include the amount the score is incremented when player object 34 is sensed by sensor 46, the amount of tickets dispensed based on the score, the amount of time allowed in a game, the number of games a player may play for one coin inserted in coin slot 18, the conditions required to add to the game score and/or receive an award, the conditions required for a player to win a progressive bonus, etc. These factors can affect the difficulty of the game and the amount of awards received by players. Other functions selectable by switches 120 can include sound effects, the test mode, the type of game, and so on, depending on how many selectable functions are desired. Switches 120 can, for example, be implemented as DIP switches. Alternatively, the functions selected by switches 120 can be selected from another input device, such as a control panel or keyboard of buttons, or through software commands to the microprocessor 112.

Microprocessor 112 is also coupled to score displays 52 and 54. The bus 136 connecting the microprocessor 112 to the score displays 52 and 54 is latched by a latch 138. The score display can be a 7-segment LED digit display or other type of display.

Microprocessor 112 is also coupled to drivers 122 and buffers 124. Buffers 124 receive data from several switches and sensors, including test switch 140, coin slot switch 142, object sensor 46, and start button 16. Test switch 140 can be a switch located in the interior of game apparatus 10 accessible to the operator which activates a test mode for the game apparatus 10 to determine if the game is operating correctly. Coin slot switch 142 detects when a coin has been inserted into coin slot 18 of the game apparatus. Object sensor 46 detects when player object 34 has impacted platform 42 after being hit by the player. Start button 16 causes the game to begin and microprocessor 112/time display 54 to begin counting down from a predetermined game start time.

Drivers 122 activate and drive output devices including dispenser motor 146 for dispensing an award from ticket dispenser 22 and retraction motor 100 used in retraction mechanism 36 to retract and extend the punching bag 34. Other actuators or other output devices can be included in alternate embodiments.

The microprocessor 112 is also coupled to latches 126 which latch data for the lamp drivers 128. The lamp drivers 128 supply power to the lamps 148, which include, for example, light sources for illuminating various areas of game apparatus 10, such as the start button 16, the sides of housing 11, platform 42, and other similar areas of game apparatus 10 which can be highlighted as part of game action. In the preferred embodiment, the lamps 148 and other components in game apparatus 10 or 10' are powered by a commercially available 110 V AC power supply and power converters, which are well known in the art.

The microprocessor 112 is also coupled to a sound chip 150 which can be, for example, an OKI Voice Synthesis LSI chip available from OKI Semiconductor of San Jose, Calif. that has eight data input lines coupled to the microprocessor 112 by a latch 151. The sound chip 150 can receive its data from ROMs (not shown) and preferably outputs sound data to a low pass filter 152, an audio power amplifier 154, and finally to the output speaker(s) 24, which generate sounds to the player playing the game apparatus 10, as is well known to those skilled in the art.

A video display screen 106 can be included in some embodiments, such as game apparatus 10' shown in FIG. 4. The display screen can be coupled to a separate video display board 156,. Display board 156 is coupled to the microprocessor 112 and ROM 116 by bus 136. The video display board 156 can include video memory and other components and control circuitry needed to create a graphical output on the display screen 100 using control signals and data from the microprocessor 112. In this embodiment, microprocessor 112 is preferably a graphics-oriented microprocessor, so that the images displayed on the display screen 106 have high-quality resolution and movement. The video images on display screen 106 are moved and updated using software and hardware well-known to those skilled in the art. In alternate embodiments, the components of video display board 156 can be included on main board 111.

The preferred embodiment of the control system 110 operates briefly as follows. The microprocessor 112 first reads the low memory from ROM 116 over bus 136 and sequences through the software instructions stored in ROM. The settings of switches in the switches block 120 are also read into the microprocessor. The software from the ROM 116 then instructs the microprocessor 132 to send and receive data over the bus 136 in order to wait for a game to begin and to conduct a game. For example, when the coin slot switch 142 is activated, indicating a coin has been inserted into coin slot 18, the microprocessor receives a signal from buffers 124 on bus 136. The microprocessor also receives signals when start button 16 is pressed by the player. During game play, the microprocessor reads information from sensor 46 through buffers 124 to determine when the player object 34 has been hit by the player. The microprocessor sends appropriate output signals to the latches 138 and 126 over bus 156 to update game score displays and activate speaker 24 and lamps 148. Once the game is over, the microprocessor activates dispenser motor 146 and retraction motor 100 through drivers 122. The method of operation of the preferred embodiment of the game apparatus is described in greater detail with respect to FIG. 6.

Figure 6:
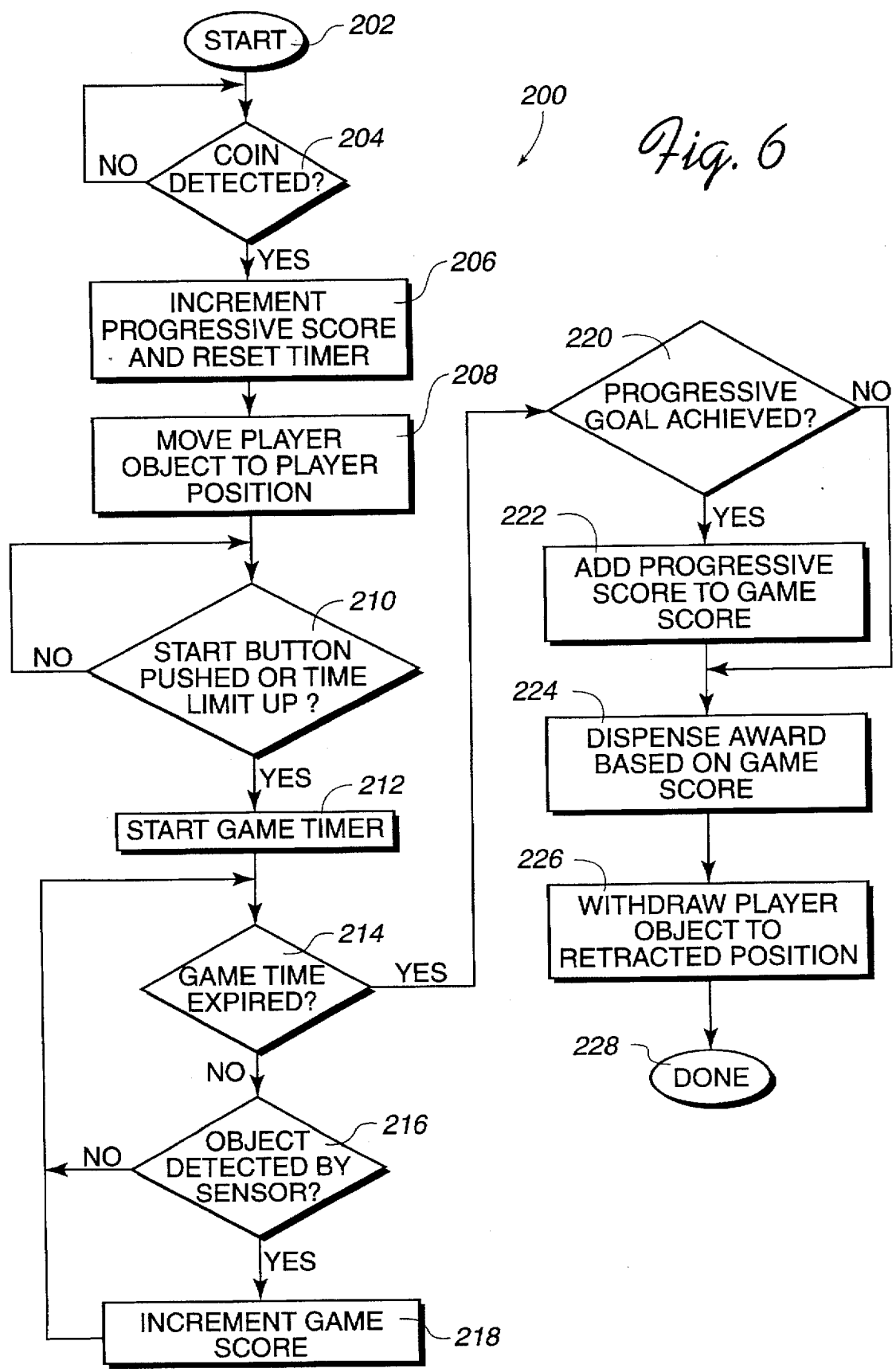
FIG. 6 is a flow diagram illustrating a method of playing and operating the game apparatus of the present invention.

FIG. 6 is a flow diagram illustrating a method 200 of operating and playing the described embodiment of game apparatus 10. The process begins at 202. In step 204, the microprocessor checks if a coin has been inserted into coin slot 18 by checking a signal from coin slot switch 162. Alternatively, other types of monetary input can be input by the player. If no coin is detected, step 204 is repeated until a coin is detected. In step 206, the progressive score is incremented and displayed on score display 56 if a progressive score is being implemented on individual game apparatus 10 or among collective game apparatuses. If a multi-game system with a progressive bonus apparatus is being used, the microprocessor of the game apparatus can send a signal to the progressive bonus apparatus to increment a collective progressive score and receive an updated progressive score signal from the bonus apparatus. The microprocessor can receive an updated progressive score signal from a connected bonus apparatus any time during process 200 or even when a game is not being played, since players on other game apparatuses connected to the bonus apparatus can contribute to the collective progressive score at any time. In addition, the game timer (e.g., implemented by microprocessor 112) and time display 54 are reset to a beginning game time, such as 20 seconds.

In step 208, the player object 34 is moved to a "player position", e.g., the punching bag 34 of the described embodiment is lowered by retraction mechanism 36 as described with reference to FIGS. 3a–3c so that the player can move the punching bag by hitting it. In next step 210, the process checks if the start button 16 has been pressed by the player or if a predetermined starting time limit since the coin was inserted in coin slot 18 has expired. This starting time limit is a separate limit from the game time and is used to allow a player a specific amount of time to start a game by pressing start button 16, e.g. the starting time limit can be 5–10 seconds. If neither of these conditions is true, then the process continues to check for these conditions in step 210. If either of the conditions are true, then step 212 is implemented, in which the game timer that was reset in step 206 is started and time display 54 displays the time as it is counting down. Optionally, if the player does not push the start button 16 within the predetermined starting time limit after inserting a coin, the game process can be automatically ended at step 212. Once the game timer starts, the player may begin hitting punching bag 34.

In step 214, the process checks if the game time has expired. If so, the game is over for the player, i.e., the player's input to the game is no longer sensed. The process continues to step 220, described below. In other embodiments, other criteria can be used to determine if the game is over for the player, e.g., if the player achieves some predetermined goal, if the player gets "hit" by a displayed opponent on display screen 106, etc. If the game time has not expired, then in step 216 the process checks if the bag 34 has been detected by sensor 46. If the bag has not been detected, the process returns to step 214 to check game time. If the object has been detected, the game score (e.g., number of "hits") is incremented in step 218. In addition, other game effects can be implemented upon object detection, such as displaying animating/updating appropriate images on display screen 106, illuminating lamps on the game apparatus, and/or outputting audio feedback from speaker 24. The process then returns to step 214.

Step 220 is implemented after the game time has expired in step 214. The process checks if a progressive goal was achieved by the player during the game. A progressive goal may be achieved, for example, when the player achieves a particular high score, times a punch or hit in response to a prompt displayed by the game apparatus, etc. In addition, different goals can be designated for an individual progressive award and for a collective progressive award.

If a progressive goal was not achieved by the player in step 220, the process continues to step 224, detailed below. If a progressive goal was achieved by a player of game apparatus 10, then the accumulated progressive score displayed on score display 56 is added to the game score in step 222 which results in a new game score. When using a separate progressive bonus apparatus, the microprocessor can send a signal to the progressive bonus apparatus which indicates that the progressive goal has been achieved and includes the identity of the winning individual game apparatus 10. The progressive score would then be received by the winning game apparatus from the progressive bonus apparatus and added to the game score of the individual game apparatus 10. Alternatively, the progressive score can be kept separate from the game score and assigned to a separate award or credit to the player.

In next step 224, an award based on the game score (as modified by step 224) is dispensed to the player from award dispenser 22. For example, one award ticket can be dispensed for each point of game score. Alternatively, one award ticket can be dispensed for every X scored points; for example, X=10 or 0.5. Alternatively, an operator of the game apparatus can manually provide an award to the winning player based upon the game score. The dispensed award may be limited to a predetermined amount in some embodiments, since it is possible for players to "cheat" by putting or moving other objects in the sensing zone of sensor 46 to simulate bag 34 being hit. In those embodiments implementing validation of bag 34 (described with reference to FIG. 1), the dispensed award need not be limited.

In next step 226, the microprocessor controls the player object 34 to withdraw to its retracted position, in which the object cannot moved by the player since it is blocked by the edges of aperture 44. The game process is then complete as indicated at 228. At step 228, the process can also return to step 202 to wait for another coin to be inserted in coin slot 18.

In other embodiments, a player can be allowed to play several games after inserting a single coin or other monetary input. In such an embodiment, an award from dispenser 22 can be dispensed after each game. An award based on the progressive score might be dispensed or manually provided by an operator of the game apparatus after all games have been played, or after each game.

In other embodiments, a game might conclude based on a different game result instead of an expiration of game time. For example, a player might be required to hit bag 34 a predetermined number of times, and the game score would be the time the player took to hit the bag that number of times (instead of the number of hits). In such an embodiment, step 214 would cause the game to end (i.e., go to step 220) if the number of player's hits equalled the predetermined number; if the number of player's hits were not equal to the predetermined number, step 216 would be implemented (also, step 218 would increment the number of hits, not the game score). A game time-out check can also be provided so that the game automatically ends if no hits on bag 34 are sensed within a predetermined time limit. Such an embodiment also works well in a multiplayer game, in which players compete to achieve the lowest amount of time. In another embodiment, the game can end after a microprocessor-controlled or human-controlled opponent image 108 is knocked out during a game, or if the opponent "knocks out" the player by predetermined criteria. In embodiments which do not include a progressive score or a progressive bonus apparatus, steps 222 and 224 can be omitted.

While this invention has been described in terms of several preferred embodiments, it is contemplated that alterations, modifications and permutations thereof will become apparent to those skilled in the art upon a reading of the specification and study of the drawings. For example, many different types of structures can be used to suspend or support a punching bag 34 or other type of object for the player to strike. In addition, the punching bag 34 can be sensed using a variety of methods with varying degrees of accuracy in the sensing of the position, velocity, force, or other characteristics of bag 34 or of the strikes by the player.

It is therefore intended that the following claims include all such alterations, modifications and permutations as fall within the spirit and scope of the present invention.

What is claimed is:

1. A game apparatus comprising:
   an object that, when struck by a player, moves into a sensed zone and returns to said player such that said object may be again struck by said player;
   a sensor for detecting said object in said sensed zone; and
   a scoring device for determining a score based upon a number of times said object is sensed by said sensor in said sensed zone in a predetermined amount of time.

2. A game apparatus as recited in claim 1 wherein said object moves approximately along a predetermined path when struck by said player and returns to said player approximately along said predetermined path, and wherein said sensor detects said object at a point along said path.

3. A game apparatus as recited in claim 1 wherein said object is struck by the hands of a player.

4. A game apparatus as recited in claim 3 wherein said object includes a punching bag.

5. A game apparatus as recited in claim 3 further comprising a frame supporting said object, wherein said sensor is coupled to said frame and said object is suspended freely from said frame.

6. A game apparatus as recited in claim 5 wherein said object moves in a swing path starting from a rest position of said object to a position where said object impacts said frame.

7. A game apparatus as recited in claim 6 wherein said sensor is positioned such that said sensor detects said object when said object impacts said frame.

8. A game apparatus as recited in claim 5 wherein said sensor includes an emitter and detector pair such that said object is detected when said object breaks a beam of electromagnetic energy emitted from said emitter and detected by said detector.

9. A game apparatus as recited in claim 1 further comprising a mechanism for adjusting a position of said object such that said player can conveniently strike said object.

10. A game apparatus as recited in claim 9 wherein said mechanism for adjusting a position of said object includes a elevation handle coupled to said frame for adjusting the height of said object and said frame to a height desired by said player.

11. A game apparatus as recited in claim 1 further comprising an object retraction mechanism for moving said object to prevent said player from moving said object along said predetermined path.

12. A game apparatus as recited in claim 11 wherein said object retraction mechanism is operative to retract said object into an aperture such that said object cannot swing from said frame and extend said object out of said aperture so that said object may swing from said frame.

13. A game apparatus as recited in claim 12 wherein said object is retracted into said aperture when a game is not in progress and is extended from said aperture when a game is in progress.

14. A game apparatus as recited in claim 13 wherein said retraction mechanism includes a lead screw rotated by a motor and a nut movable on said lead screw to cause said object to be extended and retracted.

15. A game apparatus as recited in claim 7 further comprising a digital controller operative to control operations of said game apparatus.

16. A game apparatus as recited in claim 15 wherein said scoring apparatus accumulates a progressive score, said progressive score being accumulated over a plurality of games played on said game apparatus, and wherein said progressive score is awarded to said player when said player achieves a progressive goal on said game apparatus.

17. A game apparatus as recited in claim 15 further comprising a coin slot for receiving a coin from a player, wherein said scoring apparatus does not determine said game score until a coin has been inserted in said coin slot by said player.

18. A game apparatus as recited in claim 15 further comprising an award dispenser for dispensing a non-monetary award to said player, asid non-monetary award being based on said game score.

19. A game apparatus as recited in claim 1 further comprising a display screen for displaying images to said player, wherein said images are displayed and updated in response to said object being struck by said player.

20. A game apparatus as recited in claim 19 wherein said images include a portrayal of an opponent, such that when said player strikes said punching bag, said opponent is displayed as having received a strike from said player.

21. A boxing game apparatus comprising:
   a frame;
   a punching object provided for a player to strike, said punching object being coupled to said frame, wherein when said player strikes said punching object, said punching object swings in a direction and returns to said player, thereby allowing said player to repetitively strike said punching object;
   a scoring apparatus for determining a game score based upon a skilled performance of said player in striking said punching object;
   a feedback apparatus for providing feedback in response to said strikes on said punching object by said player.

22. A boxing game apparatus as recited in claim 21 wherein said game score is based on a number of times said punching object swings into a predetermined spatial zone when struck by said player, said number of times being counted within a predetermined time period.

23. A boxing game apparatus as recited in claim 22 wherein said punching object includes a punching bag suspended from said frame by a hinge.

24. A boxing game apparatus as recited in claim 22 wherein said feedback includes a displayed score equalling said number of times said punching bag swings into said predetermined spatial zone.

25. A boxing game apparatus as recited in claim 22 wherein said feedback apparatus includes a display screen for displaying said feedback including visual images of an opponent, wherein said visual images are updated in accordance with said strikes by said player of said punching object.

26. A boxing game apparatus as recited in claim 24 wherein said feedback includes visual images of a representation of said player striking said visual image of said opponent when said player strikes said punching object.

27. A boxing game apparatus as recited in claim 21 wherein said scoring apparatus includes a sensor for detecting said object in said predetermined zone.

28. A boxing game apparatus as recited in claim 27 wherein said sensor includes an emitter for emitting a beam of electromagnetic energy and a detector for detecting said beam, such that said player object breaks said beam when said player object enters said predetermined zone.

29. A boxing game apparatus as recited in claim 24 further comprising a mechanism for providing a progressive bonus score to said player when said player achieves a progressive goal, said progressive goal being communicated to said player as at least part of said feedback.

30. A boxing game apparatus as recited in claim 21 wherein said scoring apparatus determines an mount of force imparted on said object, and wherein said feedback is based at least in part on said force determined by said sensing apparatus.

31. A boxing game apparatus as recited in claim 30 wherein said force is determined by measuring a velocity of said object from a striking position of said object where said player strikes said object to a sensed position of said object.

32. A boxing game apparatus as recited in claim 21 further comprising a height adjustment mechanism for adjusting the height of said punching object to a height desired by said player.

33. A method for implementing a boxing game on a game apparatus, the method comprising the steps of:
   moving a punching bag from a retracted position to a playing position, wherein said player can strike at said punching bag in said playing position, and wherein said punching bag is suspended from a support and swings in space when struck by said player;
   sensing a number of times that said punching bag has crossed a sensed zone when said punching bag is repetitively struck by said player;
   providing a game score based on said number of times said punching bag has been sensed; and
   moving said punching bag from said playing position to said retracted position, wherein said player cannot move said punching bag to said sensed zone in said retracted position.

34. A method as recited in claim 33 further comprising a step of receiving monetary input from a player of said game apparatus before said punching bag is moved to said playing position.

35. A method as recited in claim 33 wherein said steps of moving said punching bag are accomplished using a motor.

36. A method as recited in claim 35 wherein said step of sensing a number of times that said punching bag has crossed said sensed zone includes sensing when said punching bag blocks a beam emitted by an emitter and detected by a detector.

37. A method as recited in claim 33 wherein said step of sensing said number of times is accomplished within a predetermined time period, and further comprising displaying to said player an amount of time remaining in said predetermined time period.

38. A method as recited in claim 33 wherein said game score is an amount of time said player has taken in hitting said punching bag a predetermined number of times.

39. A method as recited in claim 37 further comprising displaying visual images on a display screen which are updated in accordance with said strikes of said player on said punching bag.

40. A method as recited in claim 37 further comprising a step of allowing said player to adjust a height of said punching bag.

41. A method as recited in claim 33 further comprising a step of increasing a progressive score and adding said progressive score to said game score when said player achieves a progressive goal based on said striking of said punching bag.

42. A method as recited in claim 39 wherein said player is a first player, and further comprising a connection between said game apparatus and a second game apparatus played by a second player, such that said a player can affect said visual images displayed on the game apparatus played by the other player.

43. A method as recited in claim 34 further comprising a step of dispensing a non-monetary award to said player based on said game score.

* * * * *